Patented May 24, 1949

2,471,016

UNITED STATES PATENT OFFICE 2,471,016

HARD COMPOSITIONS FOR USE IN TOOLS
AND METHOD OF MAKING

Beryl Westmoreland-White, Coventry, England, assignor to Messrs. Hard Metal Tools Limited, Coventry, England, a British company No Drawing. Application July 3, 1945, Serial No. 603,106. In Great Britain May 15, 1944

Section 1, Public Law 690, August 8, 1946
Patent expires March 23, 1965

6 Claims. (Cl. 106—43)

This invention relates to hard compositions such as are used for making tools. It is the object of this invention to enable such tools to be produced as far as possible from materials less expensive or less difficult to obtain than those used hitherto. Cutting tools made mainly from tungsten carbide with a few percent of cobalt, with or without additions of other hard bodies such as titanium carbide, are well known and are largely used, but they are expensive to make and depend upon supplies of tungsten which are, at the present time, restricted. Proposals have been made for producing such cutting tools from alumina with or without other additions, generally of a metal which is relatively soft and ductile, to which may also be added oxides such as calcium oxide or kaolin or silicic acid and so forth, such oxides being added for the purpose of lowering the sintering temperature, but the products of such compositions have generally been found to be insufficiently resistant to shock for many purposes. A product to be useful for making cutting tools should not only have inherent hardness but should possess toughness and be resistant to shock.

I have now found that compositions useful for making cutting tools with which metals and the like can be turned in lathes at speeds greater than those customarily used with tools made of high speed steel or with tools made of cast alloys composed mainly of tungsten, cobalt, and chromium, can be made from finely divided alumina which is formed into a substantially solid body by the addition of a bonding agent such as bentonite or kaolin, or a mixture of such clays, the whole composition being finely ground and well mixed, and finally sintered in the manner well known in the manufacture of other sintered bodies. Other compounds of alumina and silica such as sillimanite, or even silica itself, may be used as the bonding agent, either alone or together with the addition of clays. The clays, compounds of alumina and silica, or silica should be added in such amounts that the total amount of silica added comprises from one and a half to ten per cent, of the whole composition. For example, if it is desired to use bentonite containing 62.5 per cent of silica, the bentonite should be added in amounts from 2.4 to 16 per cent so that the addition of silica is substantially between one and a half to ten per cent.

It is preferable to add, in addition to the silica-containing constituents, a flux such as fluospar in an amount comprising up to about five per cent of the whole composition, the flux being added for the purpose of assisting the sintering of the composition. Other fluxing agents may be used in place of fluospar, and it is only mentioned as a convenient body to use.

I prefer to use as the bonding agent bentonite or kaolin in an amount from three to five per cent of the whole composition and to add as a flux fluorspar in an amount from two or three per cent.

The alumina should preferably be substantially free from water, that is in the dehydrated condition, since the use of hydrated alumina appears to give less satisfactory results, both in hardness and strength.

The additions of the silica-containing bonding substances should be made in a finely-divided form, or in a form which after grinding and mixing is finely divided, and I prefer to use clays such as bentonite and kaolin because they are easily obtainable in a very fine form, and give an intimate mixture with the alumina. As in the manufacture of solid bodies from sintered tungsten carbide and the like, the grinding and mixing may be carried out either wet or dry, and in the former case, if the mixture is to be pressed in dies, the mixed powders should preferably be substantially dried before being pressed.

Alumina is a very abrasive substance, and in ball-milling of the constituents, especially if the operation is carried out wet, it is practically impossible to prevent contamination of the mixture from the material of which the grinding balls are composed. I find that the most thorough mixing is obtained by ball-milling the constituents wet, and, in order to prevent deleterious contamination from the balls, I prefer to use balls composed essentially of sintered tungsten carbide, generally an alloy of tungsten carbide and cobalt. When balls composed of sintered tungsten carbide are used in milling, an amount of the material of which the balls are composed is abraded from them and introduced into the mixture. I find that this introduction of tungsten carbide and cobalt does not deleteriously affect the properties of the compositions, and in some cases slightly increases the hardness. I find also that, when the wet-milling of the constituents is carried out for such a length of time that a fine grain size and very intimate mixing are obtained, so that the best properties result from the sintered composition, the amount of tungsten carbide alloy abraded off the balls is usually from four to twelve per cent, and that no deleterious effects result from this contamination.

Since such hard constituents in a finely divided condition are sometimes difficult to press without cracking occurring in the pressed block it is desirable to granulate them, as for example in the following manner. The dry powder may be pressed in dies and broken up into granules of a size which will pass through a fairly coarse sieve such as 10 to 100 mesh. Granules prepared in this manner flow better in pressing, and may be pressed in dies at substantially the same pressure as or at a higher pressure than was used for granulating.

Where blocks obtained by pressing either the fine powder or the granules prepared from the fine powder have to be shaped to form tools and the like by cutting, grinding and so forth, it is sometimes advantageous to give them greater degree of toughness to permit of these operations by heating them to a sufficiently high temperature, as in the well known process for pre-sintering pressed tungsten carbide alloys. The exact temperature required will depend on the degree of fineness of the powder and on the pressure applied in pressing the powder in the dies, but will be below 1000° C. and will usually be a temperature of the order of 600° C.

The pressed and shaped blocks, with or without an intermediate pre-sintering treatment, are sintered at temperatures from 1450° to 1700° C. for several hours. When balls made from sintered tungsten carbide are used in mixing the powders, and tungsten carbide and cobalt are present therein, precautions should be taken during the drying, pre-sintering and final sintering operations to prevent oxidation of these easily oxidisable substances, as for example by carrying out the heating operations in a non-oxidising atmosphere or in a vacuum.

In using these compositions for cutting tools and the like, it is preferable to use them in the form of tips which are attached to shanks or bodies made for example of steel, as in the well known method of using tool tips made of sintered tungsten carbide alloys. Tips made from compositions according to this invention may be attached to the said shanks or bodies by means of suitable clamps such as are sometimes used with tips composed of sintered tungsten carbide, or the tips may be attached by means of a suitable adhesive substance or cement, and I have found that a thermoplastic cement is satisfactory for this purpose.

As an example of the process according to the invention, the following may be given:

93 per cent of calcined alumina, 4.2 per cent of bentonite containing 57.7 per cent of silica, and 2.8 per cent of fluorspar were ground together and mixed thoroughly by being tumbled in a ball mill for 3 days with distilled water using balls composed of sintered tungsten carbide. The powder, after being dried in a vacuum oven, was found to contain 7.5 per cent of tungsten carbide and 0.5 per cent of cobalt. The powder was sieved through a 100 mesh sieve and pressed into blocks under a pressure of 10 tons per square inch. The blocks so formed were broken up into granules which passed through a 100 mesh sieve, and the granules were pressed at a pressure of 10 tons per square inch into blocks of a size and shape suitable for the manufacture of the desired objects. In shaping the desired objects allowance was made for the shrinkage which occurs during sintering, as in the analogous process of manufacturing objects from sintered tungsten carbide. The formed objects were sintered by being slowly heated to a temperature of 1550° C. in an atmosphere of hydrogen. The heating period occupied 13 hours and was followed by a slow cooling period of shorter duration. Pieces made in this manner had a hardness of 90 on the Rockwell-A scale. The tools made from the alumina composition were mounted on shanks or supports in the manner stated above. When used in this way as lathe tools one of the pieces machined a billet of steel of 65 tons per square inch tensile strength at a surface speed of 600 feet per minute with a depth of cut of .015 inch and a feed of .005 inch per revolution. After machining a length of 4 feet of the billet, which was approximately 8 inches in diameter, the difference in diameter between the ends of the machined length was less than .001 inch, and the finish was superior to that obtained under similar conditions of machining with tungsten carbide tools.

I claim:

1. A process of making a hard composition for tools, consisting in adding clay to alumina, the resulting aggregate containing from 1½ to 10 per cent of silica and from 90 to 98½ per cent of alumina, grinding the aggregate with abrasive bodies comprising tungsten carbide until an intimate and finely divided mixture is obtained, compressing the mixture, breaking the compressed product into granules corresponding in size to 10 to 100 meshes, moulding the granulated product under pressure and sintering it at a temperature from 1450 to 1700 degrees centigrade.

2. A process of making a hard composition for tools, consisting in adding clay and fluorspar to alumina, the resulting aggregate containing from 1½ to 10 per cent of silica, from 2 to 5 per cent of the fluorspar and from 85 to 96½ per cent of alumina, grinding the aggregate with abrasive bodies comprising tungsten carbide until an intimate and finely divided mixture is obtained, compressing the mixture, breaking the compressed product into granules corresponding in size to 10 to 100 meshes, moulding the granulated product under pressure and sintering it at a temperature from 1450 to 1700 degrees centigrade.

3. A process of making a hard composition for tools, consisting in adding clay and fluorspar to alumina, the resulting aggregate containing from 1½ to 10 per cent of silica, from 2 to 5 per cent of the fluorspar and from 85 to 96½ per cent of alumina, grinding the aggregate with abrasive bodies comprising tungsten carbide until the ground mixture contains from 4 to 12 per cent of tungsten carbide disintegrated from said abrasive bodies, compressing the mixture, breaking the compressed product into granules corresponding in size to 10 to 100 meshes, moulding the granulated product under pressure and sintering it at a temperature from 1450 to 1700 degrees centigrade.

4. A process according to claim 3 in which the product after grinding and compressing is first pre-sintered at a temperature from 600 to 1000 degrees centigrade, is then shaped to the form of the article to be produced and finally sintered at a temperature from 1450 to 1700 degrees centigrade.

5. A metal-cutting tool composed of a hard sintered composition comprising from 78 to 94 per cent alumina, from 1½ to 10 per cent silica and from 4 to 12 per cent tungsten carbide.

6. A hard composition suitable for use for metal cutting comprising from 73 to 92½ per cent alumina, from 1½ to 10 per cent silica, from 4 to 12 per cent tungsten carbide, and from 2 to 5 per cent of a fluorspar.

BERYL WESTMORELAND-WHITE.

REFERENCES CITED

The following references are of record in the file of this patent:

UNITED STATES PATENTS

| Number | Name | Date |
| --- | --- | --- |
| 1,942,431 | Jung | Jan. 9, 1934 |
| 2,109,246 | Boyer et al. | Feb. 22, 1938 |
| 2,154,069 | Fessler et al. | Apr. 11, 1939 |
| 2,272,618 | Fessler et al. | Feb. 10, 1942 |

OTHER REFERENCES

Ser. No. 269,236, Klingler et al. (A. P. C.), pub. May 11, 1943.